United States Patent Office 2,751,412  
Patented June 19, 1956

2,751,412

N-(HYDROXYALKYL)-3-PHENYLSALICYLAMIDES

Melville Sahyun and John A. Faust, Santa Barbara, Calif., assignors, by mesne assignments, to Cutter Laboratories, Inc., Berkeley, Calif., a corporation of California No Drawing. Application April 9, 1954,  
Serial No. 422,246

2 Claims. (Cl. 260—559)

This invention relates to N-(hydroxyalkyl)-3-phenyl-salicylamides and is more particularly concerned with compounds having the structural formula:

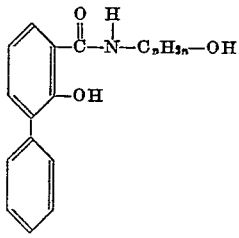

wherein $n$ is an integer from two to six, inclusive, and to processes whereby such compounds may be prepared.

The compounds of the present invention have indicated utility as analgesic agents in preliminary pharmacological testing. These compounds are solids, slightly soluble in water, but soluble in ethanol.

Preparation of the compounds of the present invention may be readily accomplished by providing a lower-alkyl ester of 3-phenylsalicylic acid, such as, for example, the methyl, ethyl, propyl, isopropyl, butyl, pentyl, hexyl, isobutyl, et cetera, ester, and subsequently reacting such ester in an aminolysis type of reaction with a suitable amino alcohol. Amino alcohols which are suitable include, for example, monoethanolamine, isopropanolamine, propanolamine, butanolamine, pentanolamine, hexanolamine, et cetera. That is, an amino alkanol containing from two to six carbon atoms, a mono-hydroxy and monoamino moiety. The ester and amino alcohol are contacted in the presence of a suitable solvent for a period of at least two days. Representative solvents which are suitable include, for example, methanol, ethanol, propanol, et cetera. It will be understood, of course, that this aminolysis type of reaction is dependent on an interchange of the amino group for the alcohol moiety of the lower-alkyl ester which is provided. Therefore, if reaction temperatures above room temperature are used, reaction time will be relatively short, whereas, if merely room temperature is utilized, then the reaction time will be somewhat longer. We have found that by using room temperatures and approximately thirteeen days, 86–90 percent of the theoretical yield of the desired product may be obtained. Separation of the product is accomplished in conventional manner, as by distillation and recrystallization.

The following example is given to illustrate a particular procedure whereby the compounds of the present invention may be prepared, however, such procedure is not to be construed as limiting.

Example

A mixture of ten grams (0.044 mole) of methyl 3-phenylsalicylate, 30.5 grams (0.5 mole) of ethanolamine, fifty milliliters of methanol, and ten milliliters of water was allowed to stand in a stoppered bottle for thirteen days. Upon completion of this time, the reaction mixture was diluted with fifty milliliters of water and acidified with hydrochloric acid to a pH of about 2.0. The solid product, which formed, was separated by filtration, treated with charcoal and chloroform, and upon the addition of heptane and with gradual cooling, N-(beta-hydroxyethyl)-3-phenylsalicylamide, as colorless platelets, melting at 128–129 degrees centigrade, and weighing 9.6 grams (86 percent of the theoretical yield) was separated and collected.

In a manner similar to that of the foregoing example, N-(gamma-hydroxypropyl)-3-phenylsalicylamide, N-(delta-hydroxybutyl)-3-phenylsalicylamide, N-(omega-hydroxyhexyl)-3-phenylsalicylamide, N-(hydroxypentyl)-3-phenylsalicylamide, et cetera, may be prepared.

Various modifications may be made in the compounds and process of the present invention without departing from the spirit or scope thereof, and it is to be understood that we limit ourselves only as defined in the appended claims.

We claim:

1. A compound selected from the group consisting of those compounds having the formula:

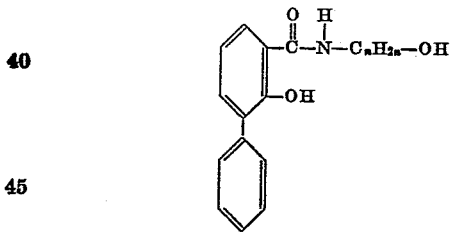

wherein $n$ is an integer from two to six, inclusive.

2. N-(beta-hydroxyethyl)-3-phenylsalicylamide.

References Cited in the file of this patent

UNITED STATES PATENTS 1,675,500    Kropp _____ July 3, 1928

OTHER REFERENCES

Way et al.: J. Pharmacol. Exptl. Therap., vol. 108, August 1953 (received February 27, 1953), pp. 450–460.